June 30, 1925. 1,543,741
K. ANDERSON
CAMERA
Filed Feb. 17, 1923    5 Sheets-Sheet 1
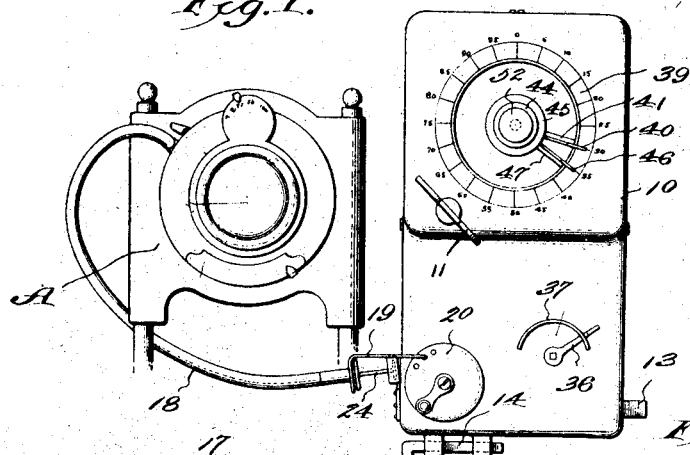
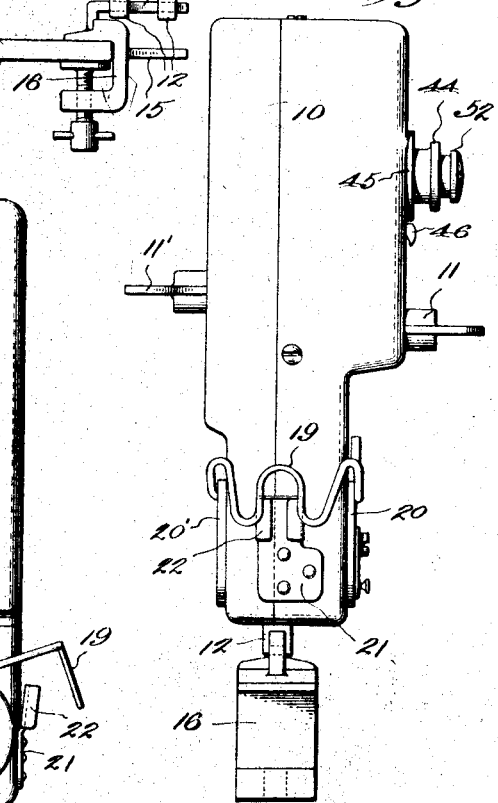
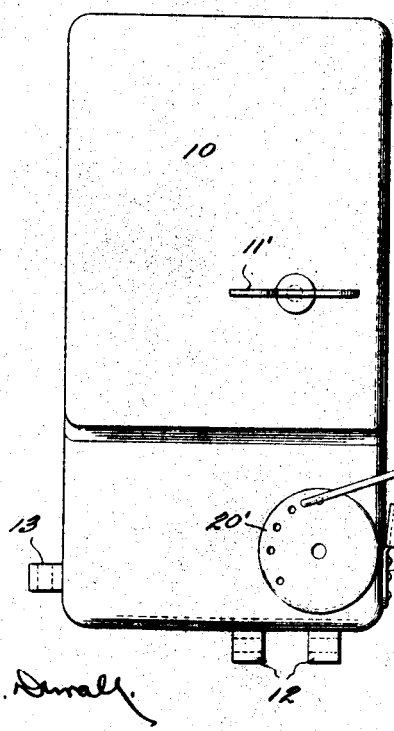

June 30, 1925.
K. ANDERSON
CAMERA
Filed Feb. 17, 1923      5 Sheets-Sheet 2
1,543,741
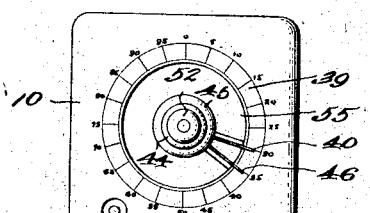
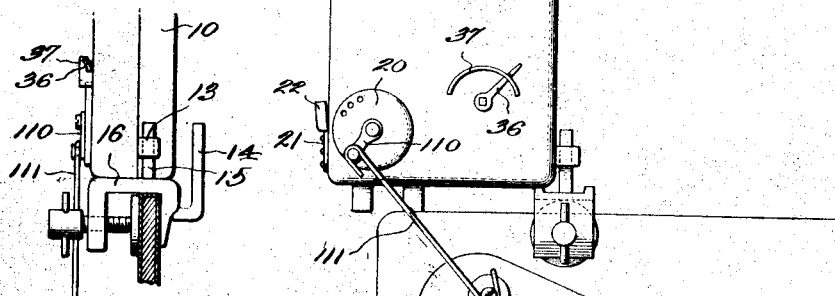
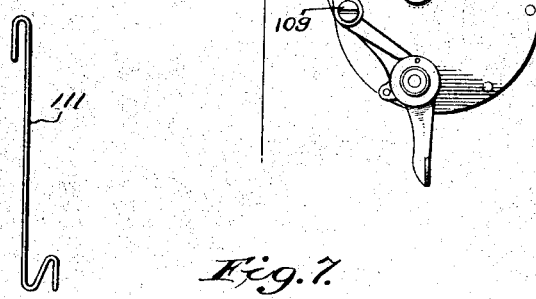
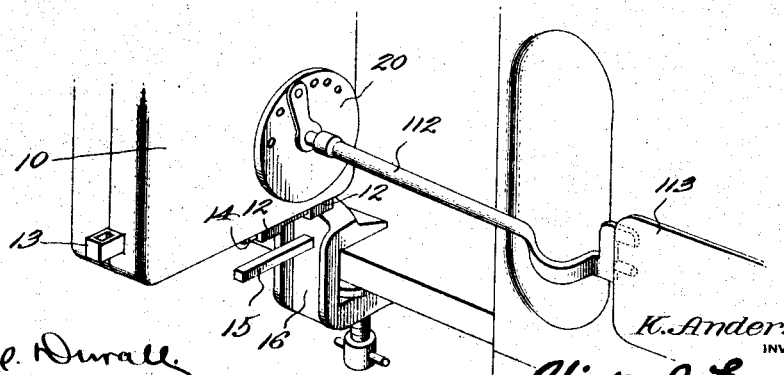
K. Anderson,
INVENTOR

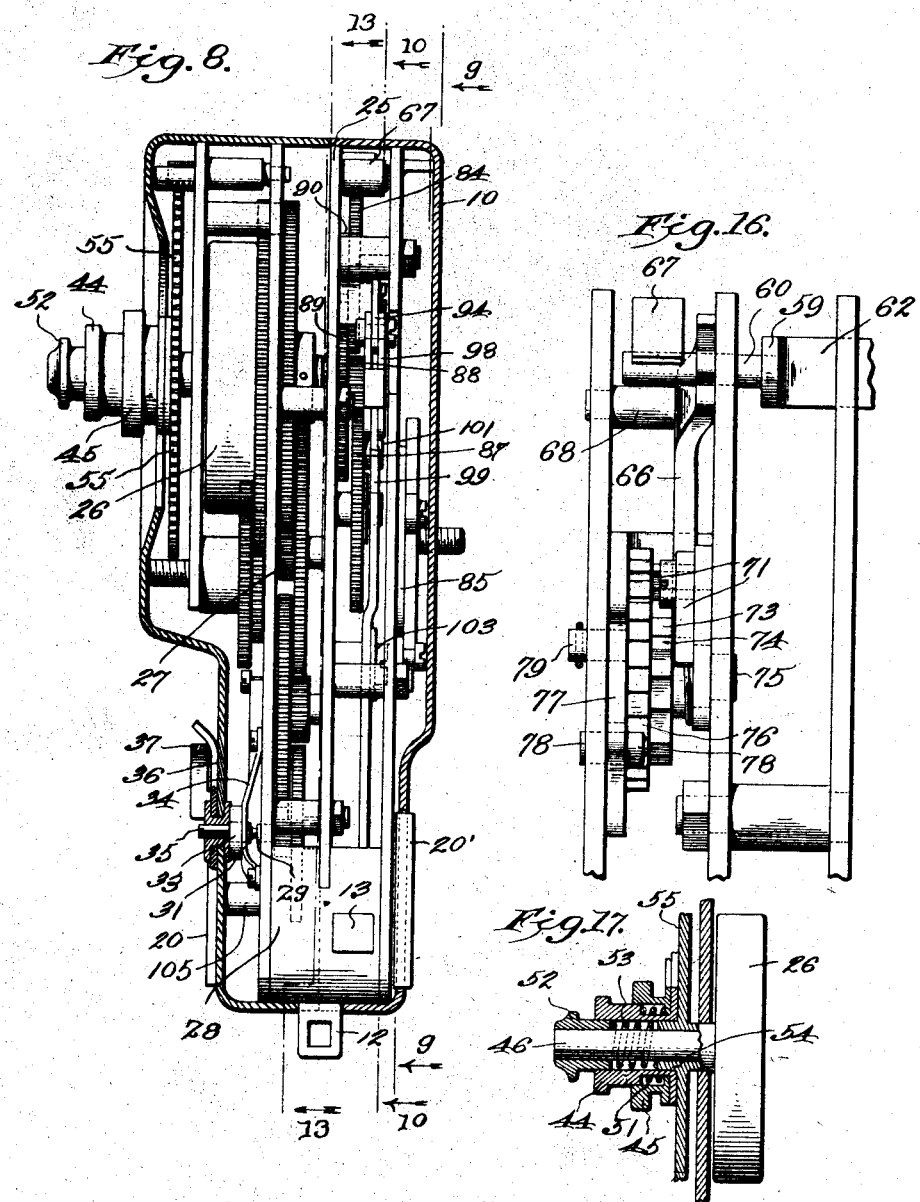

June 30, 1925.

K. ANDERSON 1,543,741

CAMERA

Filed Feb. 17, 1923    5 Sheets-Sheet 4

K. Anderson,
INVENTOR

BY Victor J. Evans
ATTORNEY

WITNESS

June 30, 1925.
K. ANDERSON
CAMERA
Filed Feb. 17, 1923
1,543,741
5 Sheets-Sheet 5
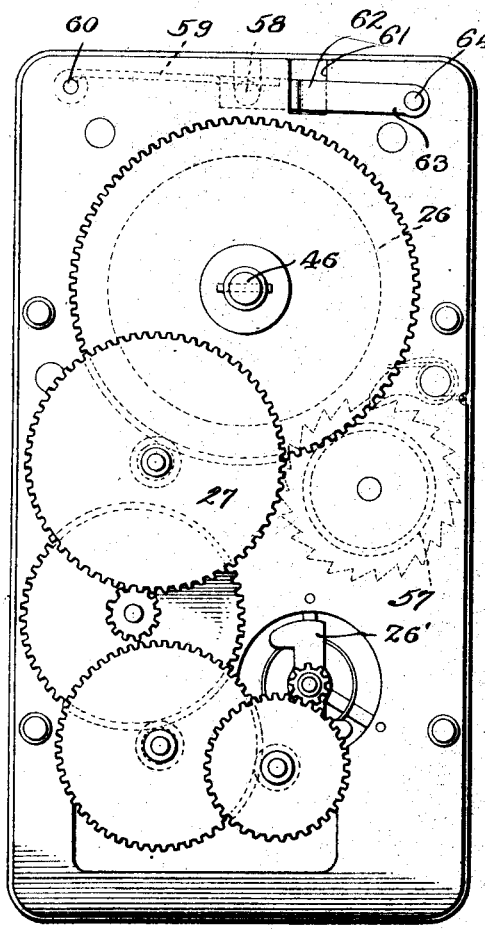
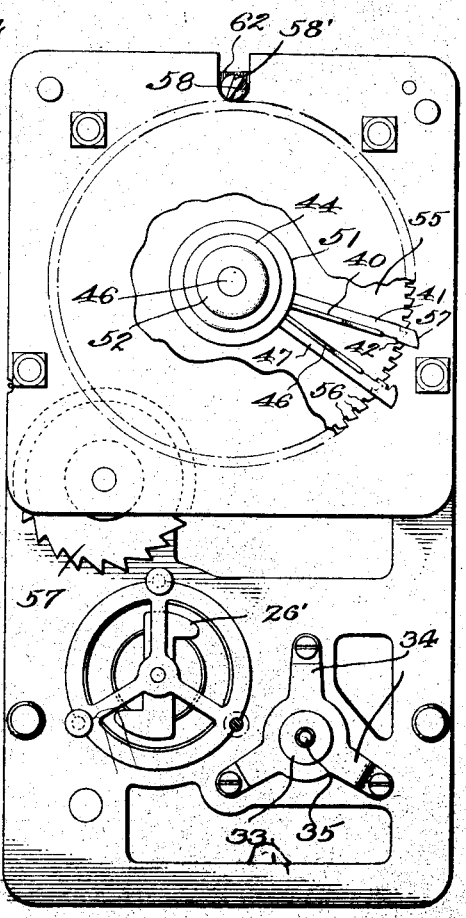
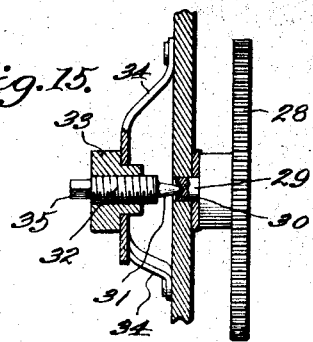
K. Anderson,
INVENTOR
BY Victor J. Evans
ATTORNEY Patented June 30, 1925.

1,543,741

UNITED STATES PATENT OFFICE.

KLAUS ANDERSON, OF SAVANNAH, GEORGIA.

CAMERA.

Application filed February 17, 1923. Serial No. 619,698.

*To all whom it may concern:*

Be it known that I, KLAUS ANDERSON, a citizen of the United States, residing at Savannah, in the county of Chatham and State of Georgia, have invented new and useful Improvements in Cameras, of which the following is a specification.

This invention contemplates the provision of a camera attachment designed to automatically control the shutter at a predetermined interval, thereby permitting the operator to take a position in advance of the camera and be included in the picture.

In carrying out the invention, I provide a shutter operating mechanism which is actuated by a time control mechanism so that any desired length of time up to approximately ninety seconds may be had in order to allow the operator to occupy a position to be included in the picture, and the shutter maintained in an opened position for various predetermined intervals.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

Figure 1 is a view showing the manner of associating the attachment with a cable release camera.

Figure 2 is an edge elevation of the attachment forming the subject matter of the invention.

Figure 3 is a view of the attachment looking from the opposite side of the attachment illustrated in Figure 1.

Figure 4 is a view similar to Figure 1, showing the attachment used in conjunction with another form of shutter operated mechanism.

Figure 5 is a fragmentary edge elevation of a structure illustrated in Figure 4.

Figure 6 is a detailed view of the shutter operating element.

Figure 7 is a view of a modified form, showing the same used in conjunction with one type of graflex camera.

Figure 8 is a vertical sectional view through the attachment.

Figure 13 is a view similar to Figure 10, showing the timing mechanism.

Figure 14 is a view of the attachment showing the front covering removed.

Figure 15 is a fragmentary view, showing the means for starting and stopping the timing mechanism.

Figure 16 is an edge elevation of a portion of the shutter operating mechanism.

Figure 17 is a sectional view showing the manner of mounting the movable pointers.

Figure 9:
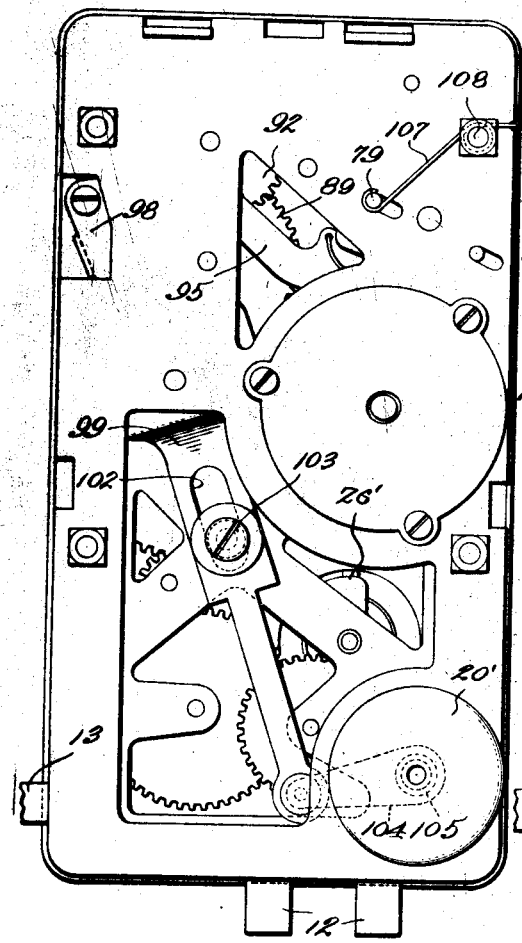
Figure 9 is a view taken on line 9—9 of Figure 8, looking in the direction of the arrows.

Referring to the drawings in detail, and particularly Figures 1 to 3 inclusive, I have illustrated the attachment forming the subject matter of the invention, and one of the several ways in which it may be attached to a camera. The attachment includes a casing 10 which is made up of two detachably connected sections, the casing housing, the timing mechanism, and the shutter operating mechanism to be hereinafter described. Each mechanism includes a spring motor adapted to be wound by the keys indicated at 11 and 11' respectively. The lower end of the casing supports a pair of spaced apertured lugs 12, while at one side of the casing, I provide a similar lug 13. The lugs 12 are adapted to receive one limb 14 of a substantially U-shaped member, the other limb 15 of which supports a clamp 16 designed to embrace and engage the focusing shield 17 of the camera indicated generally at A in Figure 1. The camera illustrated in this figure is of the cable release kind, the cable 18 being supported by a yoke-like element 19, the extremities of which embrace one edge of the casing and are associated with disks 20 and 20' mounted for partial rotation in a manner to be hereinafter described. The casing 10 supports at one side thereof a bracket 21 which includes the inwardly directed flanges 22, between which the usual push button 24 is supported. When the shutter operating mechanism is in operation, the disks 20 and 20' are partially rotated in reverse directions to move the yoke 19 and the cable 18 toward and away from the push button 24, and in this manner the shutter is opened and closed.

The casing 10 is divided by a partition 25 into parallel compartments, one of which contains the timing mechanism and the other of which contains the shutter operating mechanism. The timing mechanism includes a spring motor 26, which is associated with a train of gearing 27, one of which gears is indicated at 28 as clearly shown in Figure 15. The movement of this gear 28 controls the operation of the timing mechanism, and as clearly illustrated in Figure 15, the shaft 29 of the gear 28 is provided with a conical-shaped recess or seat 30 which receives the adjacent tapered extremity 31 of a threaded locking element 32 mounted in a suitable bearing 33 supported by a bracket 34.

Figure 11:
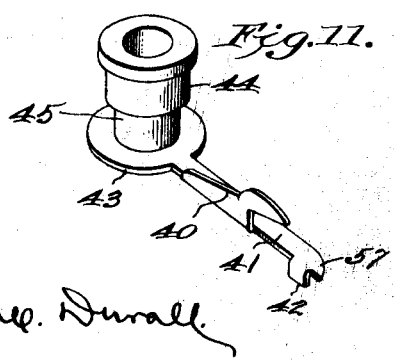
Figure 11 is a detail view of one of the movable pointers.
Figure 12:
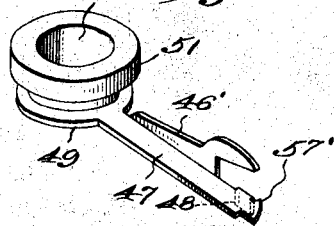
Figure 12 is a similar view of the other pointer.

The locking element 32 is provided with a squared extremity 35 which is actuated by the control lever 36 illustrated in Figures 1 and 4. This lever 36 operates behind a suitable guide 37 supported by the casing 10. When the lever 36 is arranged in the positions illustrated in Figures 1 and 4, the locking element 32 is effectively seated in the recess 31 and the timing mechanism thus frictionally held against movement. Again, when the lever 36 is swung to the opposite end of the guide 37, the locking element 32 is moved slightly away from the recess 30, and the train of gearing forming the timing mechanism allowed to operate under the influence of the spring motor 26 and a governor mechanism 26' having connection with the gearing as clearly shown in Figure 13 of the drawings. This timing mechanism embodies a pair of pointers such as illustrated in Figures 11 and 12, and the pointers are arranged to cooperate with a graduated dial indicated at 39 in Figure 1 to regulate both the period of time allowed the operator to return to a position to be included in the picture before the shutter is operated, and also the length of time for the exposure. The pointer 40 is arranged substantially at a right angle to the arm 41, which is provided with a projecting lug 42 at one end thereof for the purpose to be presently described. The arm 41 radiates from a flange 43 arranged at one end of a sleeve-like member 44 which is formed to provide an external shoulder 45. The sleeve 44 surrounds the shaft 46 of the spring motor 26, the shaft projecting beyond the casing of said motor as illustrated in Figure 17. The pointer 46' illustrated in Figure 12 is similarly arranged with relation to the arm 47 which is also provided with an offset lug 48, the arm radiating from a flange 49 arranged at one end of the sleeve 50 and in confronting relation to the flange 51.

The flange 49 of the sleeve 50 contacts the sleeve 44 of the structure illustrated in Figure 11 and surrounding this sleeve and having one end bearing against said flange 49 is a coiled spring 51, the opposite end bearing against the shoulder 45 of the sleeve 44. This spring functions to hold the sleeves 44 and 50 fixed relatively for simultaneous rotation incident to the operation of the timing mechanism, but allows independent movement of the sleeves to set the pointers at different positions about the face of the graduated dial 39 for the purpose above mentioned. The shaft 46 of the spring motor is provided with a cap 52 which projects a slight distance within the sleeve 44, and surrounding this shaft and bearing against the adjacent end of said cap is a spring 53, the opposite end of which bears against the adjacent end of the hub 54 of the notched wheel 55. Subsequent to adjusting the pointers about the graduated dial 39 and properly locating the pointers for the particular period of time which is desired for the exposure, and to permit the operator to assume a position to be included in the picture, the lugs 42 and 48 of the respective pointers are received by the adjacent notches 56 of the wheel 55. The timing mechanism also embodies a pawl and ratchet mechanism indicated at 57 to prevent retrograde movement of said mechanism. The timing mechanism is adapted to be set to release the shutter operating mechanism at a predetermined interval, and this is accomplished by means of the arms 41 and 47 of the pointers which have their extremities bevelled as at 57' to cooperate with a pin 58 having a bevel end 58' for that purpose. The pin 58 projects midway from the ends of a lever 59 arranged immediately above the timing mechanism and pivoted at one end as at 60.

Figure 10:
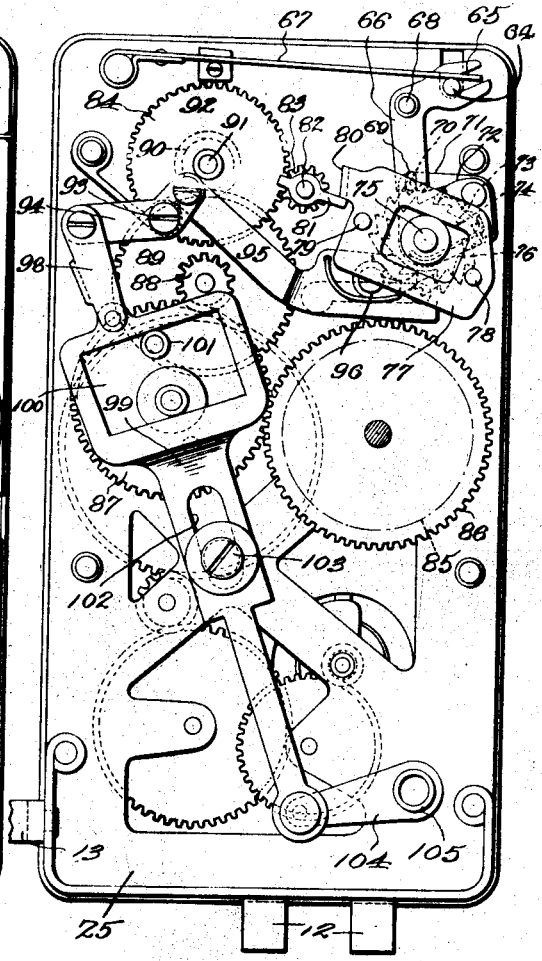
Fig. 10 is a view in elevation of the attachment with one of the outer plates removed, showing the shutter operating mechanism.

The partition 25 is slotted as at 61 to receive the offset portion of the lever 59 which is extended as at 63 and carries a pin 64. This pin operates within the forked extremity 65 of a bell crank lever 66, and is held operatively associated with said lever by means of a leaf spring 67 which reposes upon the spring as clearly shown in Figure 10.

The shutter operating mechanism is wholly disposed at one side of the partition 25 and includes the bell crank lever 66, which is fulcrumed as at 68. The opposite end of this lever is notched as at 69 to receive a pin 70 projecting from a pivoted plate 71, which supports a pawl 72. This pawl cooperates with the teeth 73 of a wheel 74 which is fixed upon the shaft 75, while fixed upon the same shaft and fixed at one side of the wheel is a similar fixed wheel 76. The slotted plate 77 slides upon the shaft 75 and supports at either end of said slot pins 78 and 79 respectively. The plate 77 is provided with an extension 80 which normally occupies the position illustrated in Figure 10, in which position it overlies the locking element 81 fixed upon the shaft 82 which carries a small gear 83 which meshes with the adjacent gear 84 of a train of gearing forming part of the shutter operating mechanism. The plate 77 is mounted to slide toward and away from the locking element 81 and is controlled in the manner to be hereinafter described. When moved away from the locking element 81, the shutter operating mechanism is free for operation. The train of gearing forming part of the shutter operating mechanism is actuated by a spring motor 85, which rotates the gear 86, the latter meshing with the gear 87, which in turn rotates the shaft supporting the small gear 88 and the large gear 89.

The large gear 89 meshes with a gear 90 carried by the shaft 91 which supports the larger gear 92, and which gear 92 meshes with the small gear 83 forming part of the lock for the shutter operating mechanism. Fulcrumed as at 93 is a bell crank lever 94 one end of which is pivotally connected with an arm 95 which supports a spring pressed pawl 96 which cooperates with the teeth of the wheel 76 to limit the return movement of said arm 95 to normal position. The opposite end of the bell crank lever 94 is connected by means of a link 98 to a reciprocatory element 99. This element is enlarged at its free end and provided with a rectangular opening 100 in which opening operates a small roller 101 carried by the gear 87, and which roller is instrumental in imparting the reciprocatory motion as above stated. The lower part of this element is slotted as at 102 to receive a guide stud or pin 103, the lower extremity of said reciprocatory element being connected with a crank 104 associated with the shaft 105 which supports the oscillating disks 20. Manifestly, when the shaft 105 is rotated in one direction incident to the movement of the element 99, the disks 20 are turned to actuate the shutter control cable 18 of the camera indicated generally at A in Figure 1.

In practice, the attachment is clamped upon the camera on either side according to the kind of exposure desired, and the spring motor of the timing mechanism and the shutter operating mechanism is then wound. The timing mechanism is then set to actuate the shutter mechanism at a predetermined interval, depending of course upon the length of time required for the exposure, and also to permit the operator to assume a position to be included in the picture. This is done by adjusting the pointers about the face of the graduated dial 39 and as above pointed out, these pointers are susceptible of independent adjustment for this purpose, notwithstanding the fact that after they have been adjusted they move simultaneously with the toothed wheel 55 of the timing mechanism with which they are associated. For instance, one of the pointers is arranged on the numeral indicating the number of seconds that will be required to permit the operator to assume a position to be included in the picture, say for example, on the numeral 30. The other pointer is then placed on a particular numeral on the dial 31, according to the number of seconds desired for the exposure, say for example, five seconds, under which circumstances, the second mentioned pointer would be arranged over numeral 35. The pointers are then set to afford the operator thirty seconds to get in place to be included in the picture and five seconds exposure. The lever 36 is then moved to the left which releases the timing mechanism, but slightly operating the locking element 32 from the shaft of the gear 28 of said mechanism. As the timing mechainsm operates, the pointers move simultaneously toward the pin 58 carried by the lever 59. When the pointer nearest the pin 58 contacts the latter it elevates the lever 59 through the medium of the beveled ends 57' of the arms. The lever 59 is raised against the tension of the spring 67 and incident to this movement of the lever 59, the bell crank lever 66 is rocked upon its fulcrum 68. The bell crank lever is rocked in a direction to move the plate 71 together with the pawl 72 back along the toothed wheel 74, a distance of one tooth, so that the pawl 72 which is spring pressed will then engage the next tooth of said wheel.

After the lever 59 has been elevated, and the said pointer passed beyond the pin 58, the spring 67 functions to reverse the movement of the bell crank lever 66 and in so doing reverses the movement of the plates 71, which together with its pawl 72 engaging the teeth of the wheel 74 slightly rotates the shaft 75. As this shaft rotates, it also rotates the larger toothed wheel 76 which is carried by this shaft, and the tooth of said wheel adjacent the pin 78 engages the latter to shift the slotted plate 77 in a direction to move the extension 80 away from the locking element 81. The shutter operating mechanism is then released, and is actuated under the influence of the spring motor 86. It is of course to be understood that when the slotted plate 77 is shifted in the manner just described to release the shutter operating mechanism, the plate is shifted against the influence of the spring 107 which is fixed as at 108 and has one terminal engaged with the pin 79 of said plate, to return the plate to normal position at the proper time. During the operation of the shutter mechanism, the gear 87 is rotated, moving the roller 101 along the edges of the opening 100 of the element 99, thereby reciprocating said element. As the element is moved in one direction, it rocks the link 104 and rotates the shaft 105, which shaft supports the disks 20. The disks 20 actuate the yoke 19 which in turn operates the shutter control cable 18. After the picture is taken, the lever 36 is returned to the position illustrated in Figure 1, which of course stops the timing mechanism, the shutter operating mechanism being automatically controlled by the return of the slotted plates 77 which closes the shutter and which cooperates with the locking element 81 for this purpose.

In Figure 4, I have shown the invention used in conjunction with a modified form of shutter control mechanism wherein the shutter control element is indicated at 108′ and pivoted as at 109. The disk 20 is provided with a crank-like element 110, which is oscillated with the disk, and this crank-like element is connected with the shutter control element 108 by means of a connecting rod 111.

In Figure 7, I have illustrated the attachment used in conjunction with one form of a graflex camera, and when used in this manner, the disk 20 of the attachment has associated therewith, a shutter operating rod 112, which is forked at one end for association with the shutter 113.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:—

1. A camera attachment comprising a casing, a graduated dial on the casing, a shutter operating mechanism arranged within the casing, a shaft included in the shutter operating mechanism, an operative connection between the shaft and shutter, means for normally holding said shutter operating mechanism inoperative, said means including a spring pressed horizontally disposed lever, a pin projecting centrally from the lever, a timing mechanism arranged within the casing, pointers each having beveled ends and including arms movable about the dial by the timing mechanism, a beveled end formed on the pin and being arranged in the path of the beveled ends of the pointers to be engaged thereby to actuate said lever and release the shutter mechanism at and for predetermined intervals.

2. A camera attachment comprising a casing, a shutter operating mechanism arranged within the casing and including a train of gearing, a spring motor for operating said gears, a connection between the gears and the shutter of the camera, a rotatable shaft, means for normally locking said mechanism against movement and including an element slidable, a spring pressed governor controlled timing mechanism arranged within the casing, arms including pointers rotated by the timing mechanism means actuated by the timing mechanism through the medium of the ends of the arms for intermittently rotating said shaft to move said sliding element in one direction and release the shutter mechanism at and for predetermined intervals, and means for returning the sliding element to normal position.

3. A camera attachment comprising a casing, a shutter operating mechanism arranged within the casing, and including a train of gears, a spring motor for operating said gears, a reciprocatory element, a connection between said element and the shutter of the camera, means for normally locking said mechanism against movement, said means including a rotatable shaft, a slotted plate slidable on said shaft and normally occupying a position to lock said mechanism, a ratchet on said shaft, a pawl normally engaging said ratchet to hold the shaft immovable, a timing mechanism arranged within the casing, means actuated by the timing mechanism and including a bell crank lever for moving said pawl into engagement with a different tooth of said ratchet at a predetermined interval, means for returning said bell crank lever to normal position and incidentally turning said shaft, and means carried by said shaft and cooperating with said sliding plate to move the latter in a direction to release the shutter mechanism incident to the rotation of said shaft, and means for returning said plate to normal position.

In testimony whereof I affix my signature.

KLAUS ANDERSON.